(12) United States Patent
DiSabatino

(10) Patent No.: US 10,161,504 B2
(45) Date of Patent: Dec. 25, 2018

(54) BACKLASH ADJUSTMENT SYSTEM AND METHOD

(71) Applicant: Deere & Company, Moline, IL (US)

(72) Inventor: Benjamin DiSabatino, Brantford (CA)

(73) Assignee: DEERE & COMPANY, Moiline, IL (US)

( * ) Notice: Subject to any disclaimer, the term of this patent is extended or adjusted under 35 U.S.C. 154(b) by 92 days.

(21) Appl. No.: 15/337,837

(22) Filed: Oct. 28, 2016

(65) Prior Publication Data

US 2018/0119797 A1  May 3, 2018

(51) Int. Cl.
*F16H 57/12* (2006.01)
*E02F 3/36* (2006.01)
*F16H 1/22* (2006.01)

(52) U.S. Cl.
CPC ............ *F16H 57/12* (2013.01); *E02F 3/3681* (2013.01); *F16H 1/22* (2013.01); *F16H 2057/122* (2013.01); *F16H 2057/125* (2013.01)

(58) Field of Classification Search
CPC ...... F16H 57/12; F16H 1/22; F16H 2057/122; F16H 2057/125; E02F 3/3681
See application file for complete search history.

(56) References Cited

U.S. PATENT DOCUMENTS

| | | | | |
|---|---|---|---|---|
| 4,211,252 A | * | 7/1980 | Pezzini | B66C 3/16 137/580 |
| 6,318,199 B1 | * | 11/2001 | Buck | B25B 17/02 74/410 |
| 9,719,492 B2 | * | 8/2017 | Pasquet | F03D 7/0224 |
| 2007/0034033 A1 | * | 2/2007 | Nozue | E02F 9/0808 74/409 |
| 2008/0179482 A1 | * | 7/2008 | van Amelsfoort | E02F 3/3681 248/349.1 |
| 2015/0180304 A1 | * | 6/2015 | Miller | F16H 1/28 475/149 |
| 2016/0264265 A1 | * | 9/2016 | Garland | F16H 57/12 |

OTHER PUBLICATIONS

John Deere, Wrist Adapter, K2 and MSeries, FR21B Disc Saw Felling Head (Worldwide Edition), Parts Catalog, Issue No. 10111, Section 44, p. 18.

(Continued)

*Primary Examiner* — Zakaria Elahmadi

(57) ABSTRACT

In accordance with an example embodiment, a wrist includes a frame, ring gear rotatable about a ring axis, and motor assembly with a pinion subassembly and motor with an output shaft. The pinion subassembly includes an internal spline and pinion connected to opposite sides of an internal shaft and rotatable about a pinion axis, and motor and frame bolt patterns. The motor is fastenable to the pinion subassembly at a plurality of motor-pinion indices via the motor bolt pattern. The pinion subassembly is fastenable to the frame mount at a plurality of pinion-frame indices via the frame bolt pattern so as to mesh the pinion with the ring gear and allow the output shaft to drive the ring gear via the internal spline, internal shaft, and pinion. The distance between the ring axis and the pinion axis varies for the plurality of pinion-frame indices.

20 Claims, 4 Drawing Sheets

(56) References Cited

OTHER PUBLICATIONS

John Deere, Wrist Motor Components, FR21B Disc Saw Felling Head (Worldwide Edition), Parts Catalog, Issue No. 10111, Section 44, p. 19.
John Deere, Gearbox, FR21B Disc Saw Felling Head (Worldwide Edition), Parts Catalog, Issue No. 10111, Section 14, p. 20.
Tigercat, 340 Degree Wrist, Parts Catalog, Issue No. 1/1114, p. No. 216.08.61-62.
Tigercat, High Torque, 340 Degree Wrist, Parts Catalog, Issue No. 1/1114, p. No. 216.08.71-72.

\* cited by examiner

BACKLASH ADJUSTMENT SYSTEM AND METHOD

TECHNICAL FIELD

The present disclosure generally relates to a machine and a method. An embodiment of the present disclosure relates to a machine and method allowing for gear backlash adjustment.

BACKGROUND

In gear trains, backlash refers to the clearance between gears in the gear trains, specifically the clearance between the teeth of meshed gears. For many gear train designs, a certain amount of backlash is desirable and greater or lesser amounts of backlash may be less desirable. Gear trains may be designed with systems or methods to adjust the amount of backlash, either at the time the gear train is assembled or during later adjustment of the gear train.

SUMMARY

Various aspects of examples of the present disclosure are set out in the claims.

According to an aspect of the present disclosure, a wrist for attachment to a boom of a work vehicle may include a frame, slew bearing, and motor assembly. The frame may include a frame mount fixedly connected to the frame. The slew bearing may be mounted to the frame and include a ring gear rotatable relative to the frame about a ring axis. The motor assembly may include a motor and a pinion subassembly. The motor may include an output shaft. The pinion subassembly may include an internal shaft, an internal spline connected to the internal shaft and positioned on a first side of the pinion subassembly, a pinion rotatable about a pinion axis connected to the internal shaft and positioned on a second side of the pinion subassembly opposite the first side, a motor bolt pattern positioned on the first side, and a frame bolt pattern positioned on the second side. The motor may be fastenable to the pinion subassembly at a plurality of motor-pinion indices via the motor bolt pattern. The pinion subassembly may be fastenable to the frame mount at a plurality of pinion-frame indices via the frame bolt pattern. The pinion may be meshed with the ring gear when the pinion subassembly is fastened to the frame mount via the frame bolt pattern. The internal spline may receive the output shaft and the pinion may be driven by the output shaft when the motor is fastened to the pinion subassembly via the motor bolt pattern. A distance between the ring axis and the pinion axis when the pinion subassembly is fastened to the frame mount may vary for the plurality of pinion-frame indices.

According to another aspect of the present disclosure, the distance may be measured along a plane perpendicular to the pinion axis and bisecting the pinion when the motor is fastened to the pinion subassembly and the pinion subassembly is fastened to the frame mount.

According to another aspect of the present disclosure, the output shaft may be rotatable about the pinion axis.

According to another aspect of the present disclosure, the motor bolt pattern may include a plurality of holes radially symmetrically arranged about the pinion axis.

According to another aspect of the present disclosure, the pinion subassembly may further include a cylindrical pilot configured to be received by a mating hole on the frame mount. The pilot may be centered about an axis offset from the pinion axis.

According to another aspect of the present disclosure, the offset may be measured along the plane.

According to another aspect of the present disclosure, the offset may be at least 0.2 millimeters.

According to another aspect of the present disclosure, a first motor-pinion index and a second motor-pinion index may each be included in the plurality of motor-pinion indices and a first pinion-frame index and a second pinion-frame index may each be included in the plurality of pinion-frame indices. There may be a first distance between the ring axis and the pinion axis when the pinion subassembly is fastened to the frame mount at the first pinion-frame index. There may be a second distance between the ring axis and the pinion axis when the pinion subassembly is fastened to the frame mount at the second pinion-frame index. A difference between the first distance and the second distance may be at least 0.4 millimeters.

According to another aspect of the present disclosure, the first distance may be measured along the plane when the pinion subassembly is fastened to the frame mount at the first pinion-frame index and the second distance may be measured along the plane when the pinion subassembly is fastened to the frame mount at the second pinion-frame index.

According to another aspect of the present disclosure, there may be a first rotational orientation of the motor relative to the frame about the pinion axis when the motor is fastened to the pinion subassembly at the first motor-pinion index and the pinion subassembly is fastened to the frame mount at the first pinion-frame index. There may be a second rotational orientation of the motor relative to the frame about the pinion axis when the motor is fastened to the pinion subassembly at the second motor-pinion index and the pinion subassembly is fastened to the frame mount at the second pinion-frame index. The first rotational orientation may be the same as the second rotational orientation.

According to another aspect of the present disclosure, the motor bolt pattern may be radially symmetric at the same angular interval as the frame bolt pattern.

According to another aspect of the present disclosure, the pinion subassembly may further include a first bearing and a second bearing, with the first bearing supporting the internal shaft on the first side and the second bearing supporting the internal shaft on the second side.

According to another aspect of the present disclosure, a method of adjusting gear backlash of a wrist for attachment to a boom of a work vehicle (the wrist comprising a frame, a ring gear rotatable about a ring axis, and a motor assembly comprised of a pinion subassembly and a motor) may include the steps of unfastening the pinion subassembly (fastened to the frame at a first pinion-frame index, the pinion subassembly including a pinion rotatable about a pinion axis, the pinion meshed with the ring gear when the pinion subassembly is fastened to the frame at the first pinion-frame index or a second pinion-frame index, the pinion axis a first distance from the ring axis when the pinion subassembly is fastened to the frame at the first pinion-frame index), unfastening the motor (fastened to the pinion subassembly at a first motor-pinion index, the motor including an output shaft received by an internal spline of the pinion subassembly when the motor is fastened to the pinion subassembly at the first motor-pinion index or a second motor-pinion index), refastening the motor to the pinion subassembly (after the step of unfastening it) at the second motor-pinion index, and refastening the pinion subassembly (after the step of unfastening it) to the frame at the second pinion-frame index, the pinion axis a second distance from the ring axis when the pinion subassembly is fastened to the frame at the second pinion-frame index, the difference between the first distance and the second distance being at least 0.2 millimeters.

According to another aspect of the present disclosure, the rotational orientation of the motor relative to the frame about the pinion axis before unfastening the pinion subassembly and motor is substantially the same as it is after refastening the motor and pinion subassembly.

According to another aspect of the present disclosure, the distance is measured along a plane perpendicular to the pinion axis and bisecting the pinion when the motor is fastened to the pinion subassembly and the pinion subassembly is fastened to the frame.

According to another aspect of the present disclosure, the output shaft is rotatable about the pinion axis.

According to another aspect of the present disclosure, the pinion subassembly is fastenable to the frame via a frame bolt pattern at a plurality of pinion-frame indices, including the first pinion-frame index and the second pinion-frame index, and the motor is fastenable to the pinion subassembly via a motor bolt pattern at a plurality of motor-pinion indices, including the first motor-pinion index and the second motor-pinion index.

According to another aspect of the present disclosure, the frame bolt pattern is radially symmetric at the same angular interval as the motor bolt pattern.

According to another aspect of the present disclosure, the pinion subassembly includes an internal shaft, an internal spline is mounted at a first side of the internal shaft, the pinion is mounted at a second side of the internal shaft opposite the first side, a first bearing supports the internal shaft on the first side, and a second bearing supports the internal shaft on the second side.

According to another aspect of the present disclosure, the pinion subassembly further includes a cylindrical pilot configured to be received by a mating hole on the frame mount and the pilot is centered about an axis offset from the pinion axis.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 5 of the drawings.

Figure 1:
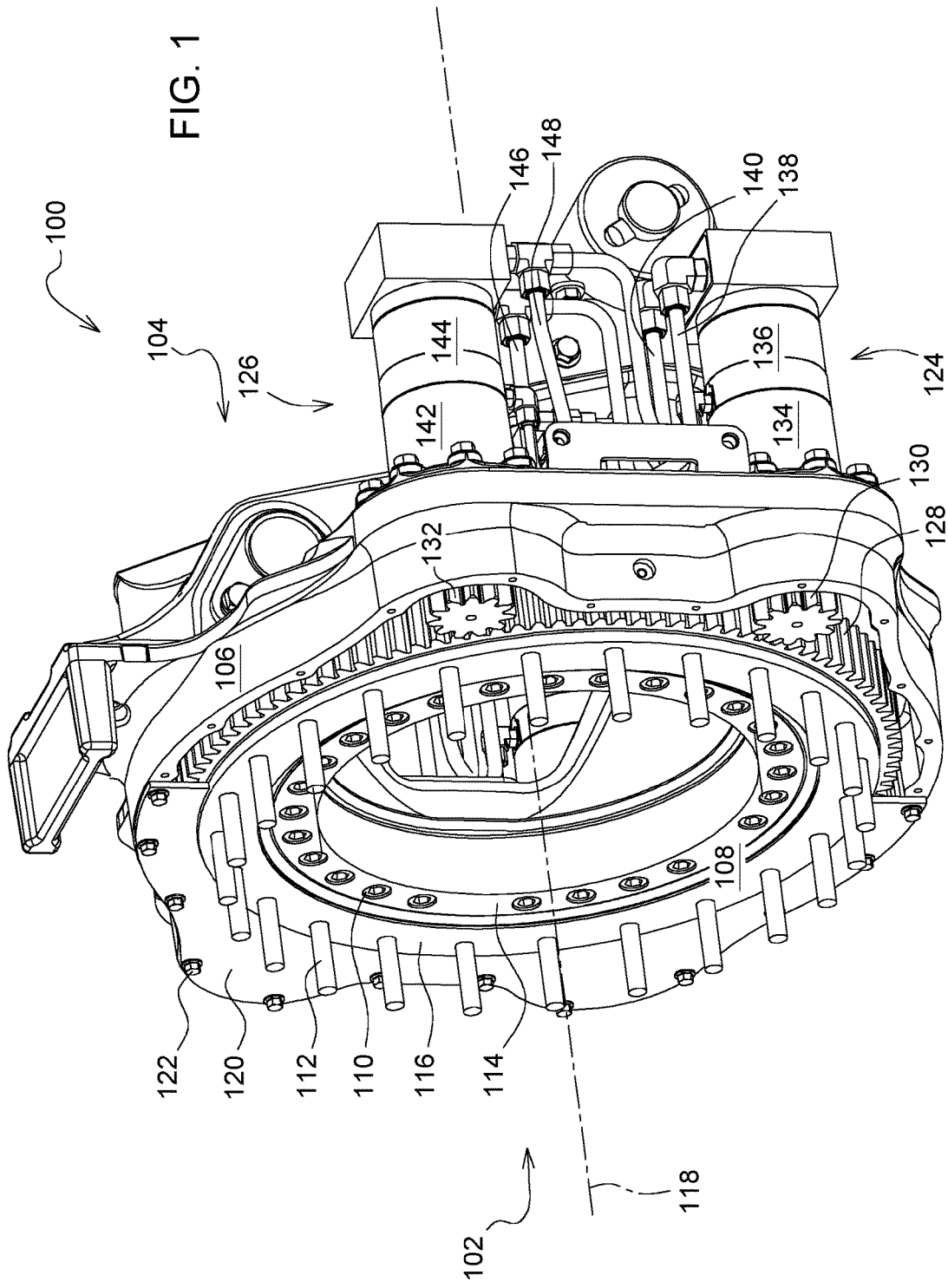
FIG. 1 is a perspective view of a wrist for a work vehicle with portions removed.

FIG. 1 illustrates a wrist 100 which may be attached to a work vehicle. The wrist 100 may be used to connect a work tool to a work vehicle such that the work tool may be pivoted relative to the work vehicle. As one example, the wrist 100 may connect a disc saw felling head tool on a tool side 102 of the wrist 100 to a linkage of a feller buncher work vehicle on the vehicle side 104 of the wrist 100, enabling the disc saw felling head to rotate relative to the linkage. In alternate embodiments, the vehicle could be a construction, forestry, mining, or other work vehicle, and the work tool could be any number of works tools such as felling heads, processing heads, grapples, hammers, or other work tools.

The wrist 100 comprises a frame 106 which provides structure and support for the wrist 100. The frame 106 is configured to be attached to the work vehicle, for example through a tiltable connection in which the frame 106 is joined to a linkage of the work vehicle by pins which enable the work vehicle to tilt the wrist 100 relative to the linkage. The linkage may also be actuated to position the wrist 100 relative to the work vehicle, such as by raising or lowering it. As an alternate, the frame 106 may be configured for a fixed connection to the work vehicle, such as a connection with a series of fasteners such as bolts. The frame 106 may be constructed from one or multiple components, different materials, and manufactured by a number of different methods, but as one example, it may comprise a cast part formed from iron or steel.

The wrist 100 also comprises a slew bearing 108. The slew bearing 108 is mounted to the frame 106 by a plurality of fasteners 110, and a work tool may be mounted to the slew bearing 108 by a plurality of fasteners 112. The fasteners 110 fixedly connect an inner race 114 of the slew bearing 108 to the frame 106, while the fasteners 112 allow for a work tool to be fixedly connected to a ring 116 of the slew bearing 108. A set of ball bearings cooperates with the inner race 114 and the ring 116 to allow for relative rotation between these two components about a ring axis 118, enabling a work tool connected on the tool side 102 of the wrist 100 via the fasteners 112 to rotate relative to the frame 106 and the vehicle side 104 of the wrist 100.

In this embodiment, the frame 106 and slew bearing 108 each have a cavity surrounding the ring axis 118, enabling components such as hydraulic, electrical, pneumatic, lubrication, or dye lines to be routed through the frame 106 and the slew bearing 108 to connect to the work tool. Routing such lines through the wrist 100 near the ring axis 118 may reduce the variations in line length and position resulting from rotation of the ring 116 relative to the frame 106, which in turn may reduce the amount of slack necessary in the lines or increase the life of the lines through a reduction in movement and chafing. While the wrist 100 illustrated in FIG. 1 is designed to allow limited rotation of the ring 108 relative to the frame 106, and thus allow a work tool only a limited range of clockwise or counterclockwise rotation about the ring axis 118, some alternate embodiments are designed to permit unlimited rotation in either direction.

The wrist 100 also comprises a lubricant shield 120 which is removably secured to the frame 106 with a series of fasteners 122. The lubricant shield 120 covers and closes off some of the cavities between the frame 106 and the slew bearing 108. By covering and closing off these cavities, the amount of debris (e.g., dust, dirt, rock, and wood chips) which enters the cavities may be reduced. Such debris can damage certain components of the wrist 100, degrade its performance, or necessitate increased maintenance. Additionally, the lubricant shield 120 covering and closing off the cavities enables a lubricant to be confined within the cavities. Fresh lubricant may be injected into the cavities to lubricate components within the cavities and to flush old lubricant and debris trapped therein out of gaps or reliefs between the lubricant shield 120, slew bearing 108, and frame 106. In this embodiment, the lubricant shield 120 is comprised of two pieces, but in other embodiments it may be integrally formed as one piece, or may be formed from more than two pieces. In FIG. 1, only one of the two pieces of the lubricant shield 120 is illustrated, while the other half of the lubricant shield 120 has been removed from the view to reveal internal components.

The rotation of the ring 116 relative to the frame 106, and thus of the work tool relative to the work vehicle, may be controlled by a first motor assembly 124, a second motor assembly 126, a third motor assembly (not visible), and a fourth motor assembly (not visible) which drive a circular ring gear 128 included in the ring 116 about the ring axis 118. The ring gear 128 engages (meshes) with a first pinion 130, a second pinion 132, a third pinion (not shown), and a fourth pinion (not shown), with each pinion spaced apart from the other pinions about the outer surface of the ring gear 128. The first pinion 130 is included in a first pinion subassembly 134, which is driven by a first motor 136, and the first pinion 130, first pinion subassembly 134, and first motor 136 are all included in the first motor assembly 124. The first motor 136, in this embodiment a hydraulic motor, is driven by the flow of pressurized hydraulic fluid from the work vehicle through a first hydraulic line 138 and a second hydraulic line 140. This flow of pressurized hydraulic fluid drives the rotation of an output shaft (not visible in FIG. 1, see FIG. 4) of the first motor 136, and that output shaft is engaged with the first pinion subassembly 134 and thereby drives the rotation of the first pinion 130. In this way, the flow of pressurized hydraulic fluid from the work vehicle controls the rotation of the ring gear 128 relative to the frame 106. Although the first hydraulic line 138 and the second hydraulic line 140 are each illustrated as rigid hydraulic tubes, each may be a hydraulic hose in alternate embodiments.

Similarly, the second pinion 132 is included in a second pinion subassembly 142, which is driven by a second motor 144, and the second pinion 132, second pinion subassembly 142, and second motor 144 are all included in the second motor assembly 126. The second motor assembly 126 drives the ring gear 128 via the second pinion 132 to rotate of the ring 116 relative to the frame 106, and is controlled by the flow of pressurized hydraulic fluid provided by the work vehicle through a third hydraulic line 146 and a fourth hydraulic line 148.

Figure 2:
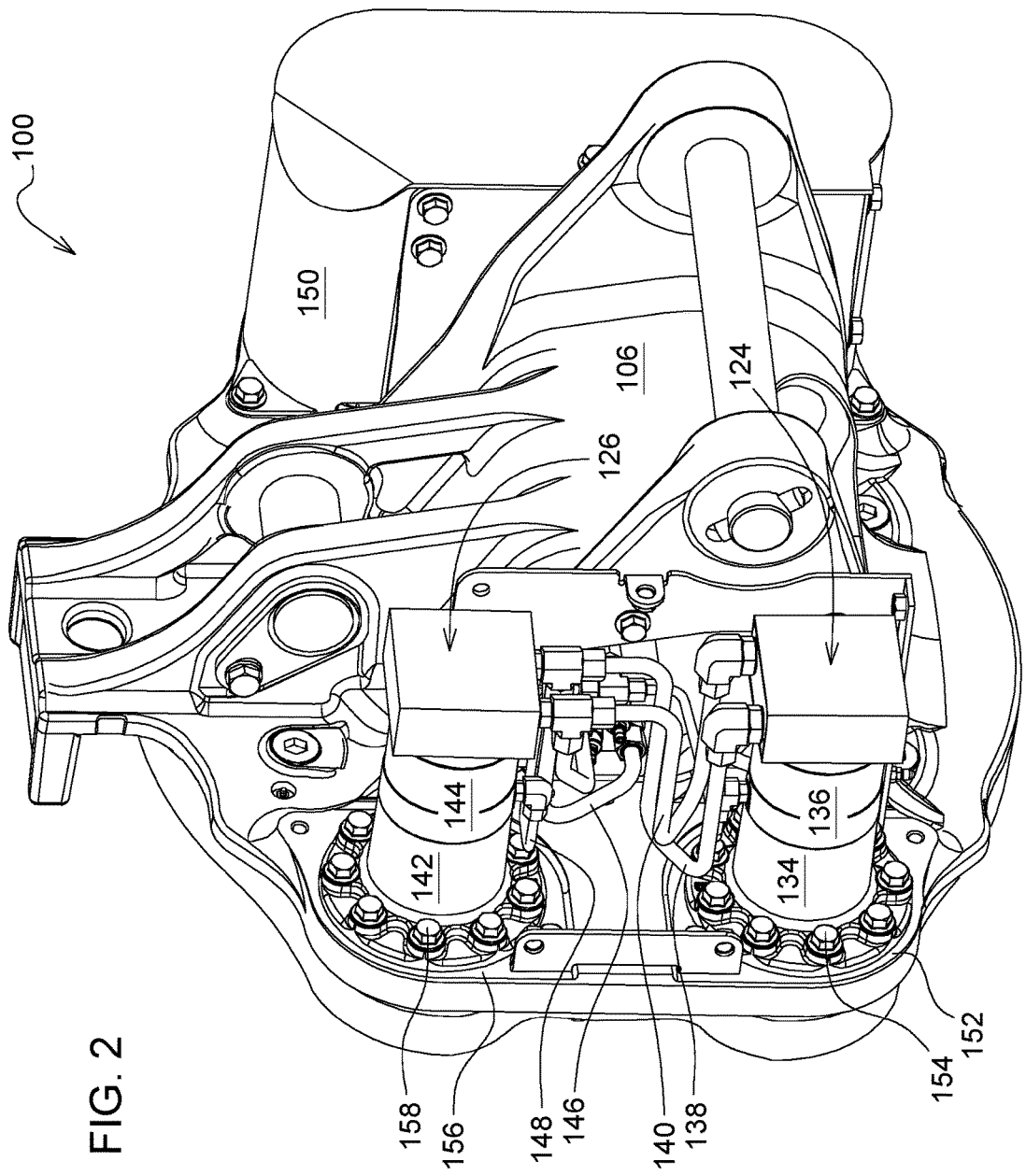
FIG. 2 is another perspective view of the wrist with portions removed.

FIG. 2 provides a perspective view of the wrist 100 from the vehicle side 104, improving visibility of the first motor assembly 124 and second motor assembly 126. The third motor assembly and fourth motor assembly are not visible, as they are surrounded by a cover 150. The first motor assembly 124 and the second motor assembly 126 may also be surrounded by a removable cover, but the cover is not shown in FIGS. 1 and 2 in order to provide visibility to these assemblies.

The first motor assembly 124 is fastened to a first frame mount 152 of the frame 106 by a plurality of fasteners 154. In this embodiment, the fasteners 154 are nine bolts which are inserted through a nine bolt hole pattern formed in the first pinion subassembly 134 and then driven into a nine tapped hole pattern formed in the first frame mount 152 to fasten the first motor assembly 124 to the frame 106. Similarly, the second motor assembly 126 is fastened to a second frame mount 156 of the frame 106 by nine fasteners 158 inserted through a nine bolt hole pattern formed in the second pinion subassembly 142 then driven into a nine tapped hole pattern formed in the second frame mount 156.

Each of the first frame mount 152 and the second frame mount 156 are formed and machined portions of the cast frame 106, and are therefore fixedly connected to the frame 106. In alternate embodiments, the first frame mount 152 and the second frame mount 156 may be designed and manufactured in an alternate manner, such as being separately formed and then attached to the frame 106 such as by welding or a structural adhesive.

Figure 3:
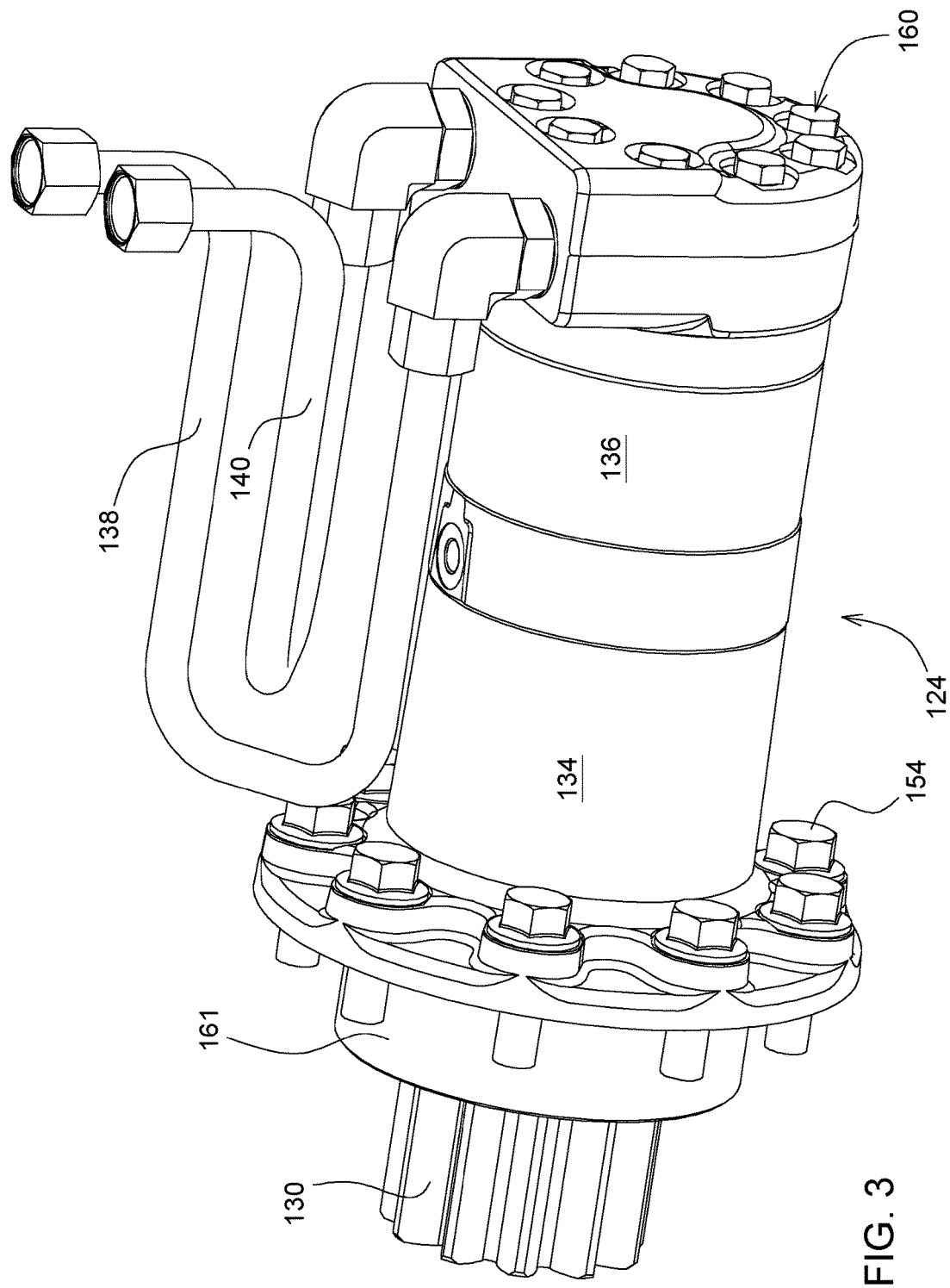
FIG. 3 is a perspective of a first motor assembly of the wrist with the first motor assembly in an assembled state.

FIG. 3 illustrates the first motor assembly 124 in an assembled state but unfastened from the frame 106. The first motor 136 is fastened to a first side of the first pinion subassembly 134 via fasteners 160, which in this embodiment are nine bolts which are each inserted through a hole in a housing of the first motor 136. Six of the nine bolts pass entirely through the motor 136 and then into a tapped hole of a bolt pattern in the first pinion subassembly 134, while three of the nine bolts terminate in threads inside the motor 136 and help to fasten the subcomponents of the motor 136 together. A second side of the first pinion subassembly 134 is, in turn, fastenable to the first frame mount 152 via the fasteners 154, which in this embodiment are nine bolts which are each inserted through a hole formed in a housing of the first pinion subassembly 134 then into a tapped hole of a bolt pattern in the first frame mount 152. When the first motor assembly 124 is fastened to the frame 106, the first pinion 130 is moved into engagement with the ring gear 128 and a pilot 161 of the first pinion subassembly 134 is received by a matching hole in the first frame mount 152.

In this context, "bolt pattern" refers a plurality of holes arranged in a pattern so as to allow for the fastening of two components together. If two components are joined by bolts, the bolt pattern may be said to be on either or both of the components, as each component needs to have at least a portion of the plurality of holes aligned so as to permit a plurality of bolts to pass through both the first and second component. The bolt pattern may refer to a plurality of through holes or a plurality of tapped holes.

When fastened to the frame 106 and in operation, pressurized hydraulic fluid from the work vehicle flows through the first hydraulic line 138 and second hydraulic line 140 and through work ports on the first motor 136. This flow of pressurized hydraulic fluid turns an output shaft of the first motor 136 (not visible in FIG. 3, see FIG. 4). This output shaft is engaged with the first pinion subassembly 134, and thereby drives the first pinion 130. The pinion 130 is engaged with the ring gear 128, thereby allowing the work vehicle to control the rotation of the ring gear 128 to the frame 106 through the work vehicle's control of the flow of pressurized hydraulic fluid through the first hydraulic line 138 and the second hydraulic line 140.

Figure 4:
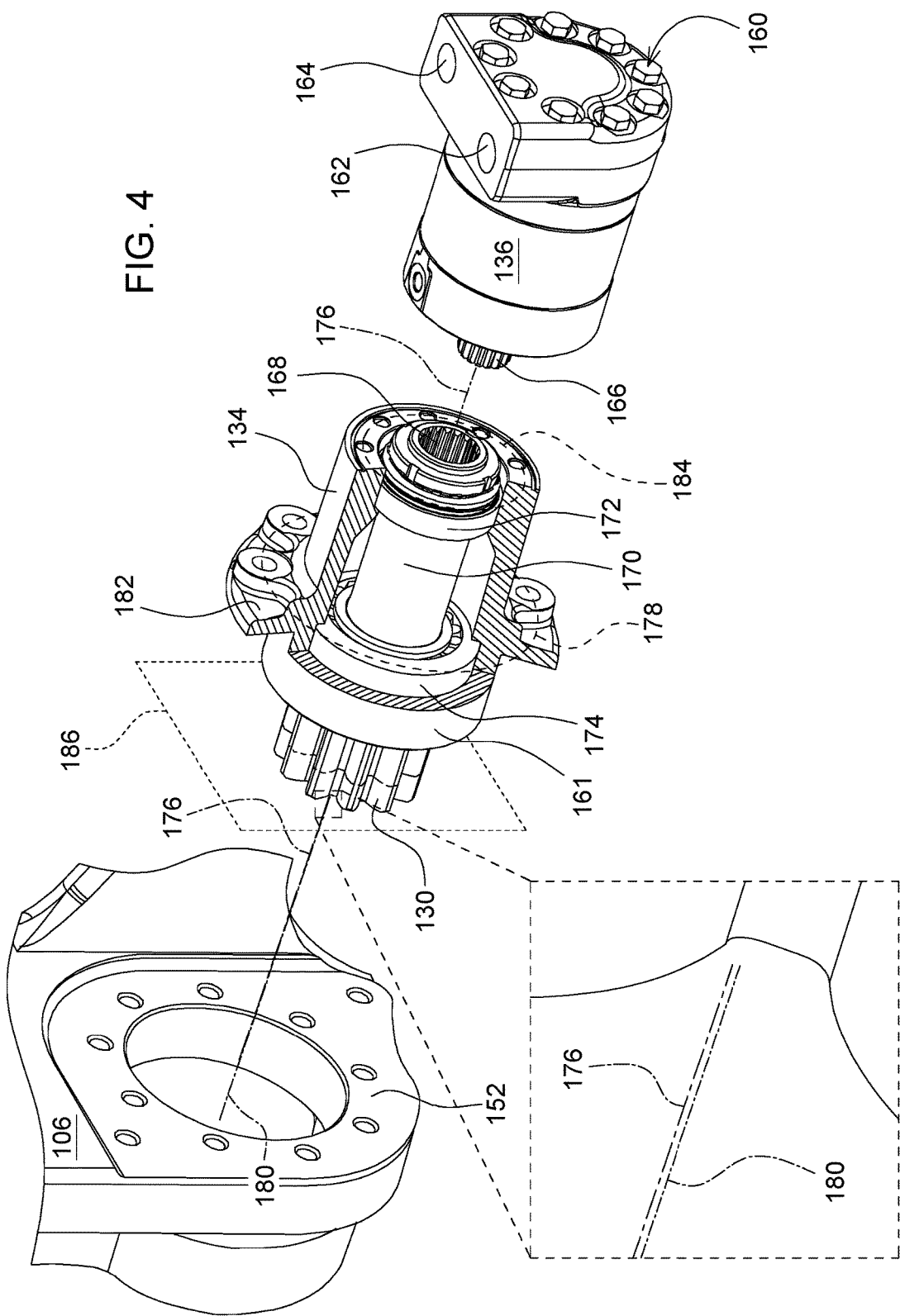
FIG. 4 is a perspective view of the first motor assembly of the wrist with the first motor assembly in a disassembled state.

FIG. 4 illustrates the first motor assembly 124 in a disassembled state, which may also be referred to as an exploded view. The fasteners 154 and fasteners 160 are not illustrated for the sake of simplicity. The first motor 136 comprises a first work port 162, to which the first hydraulic line 138 hydraulically connects, and a second work port 164, to which the second hydraulic line 140 hydraulically connects. The torque generated by the flow of pressurized hydraulic fluid through the first work port 162 and second work port 164 is transmitted through the rotation of an externally splined output shaft 166 to the first pinion subassembly 134 in operation. When the first motor assembly 124 is assembled, the output shaft 166 of the motor 136 is received by an internal spline 168 of the first pinion subassembly 134. The internal spline 168 is connected to the first pinion 130 via a rigid shaft 170, thereby allowing for the transfer of torque and power from the first motor 136 to the first pinion 130. The output shaft 166, internal spline 168, and first pinion 130 are all rotatable about a pinion axis 176. In this embodiment, the first pinion 130 and the internal spline 168 are each mounted on a side of the shaft 170 (which may be referred to as an internal shaft), which is supported by two bearings internal to the first pinion subassembly 134, a first bearing 172 located on the first side of the first pinion subassembly 134 and a second bearing 174 located on the second side of the first pinion subassembly 134. Alternate embodiments may connect and support the internal spline 168 and the first pinion 130 in alternate manners. Due to the presence of these two bearings in the first pinion subassembly 134, the motor 136 may avoid the need for one or more internal bearings configured to withstand the forces on the first pinion 130.

The first pinion subassembly 134 comprises a frame bolt pattern 178 positioned on a flange 182. The frame bolt pattern 178 comprises nine holes that may each receive a bolt. The nine holes are radially symmetrically arranged about a frame bolt pattern axis 180 such that the centerline of each hole is the same distance from the frame bolt pattern axis 180 and the angular distance (about the frame bolt pattern axis 180), or angular interval, between holes is forty degrees. The first frame mount 152 has nine threaded matching holes to the frame bolt pattern 178, such that nine bolts may simultaneously pass through each hole of the frame bolt pattern 178 and be threaded into a matching hole on the first frame mount 152. In this way, the first pinion subassembly 134 (and therefore the first motor assembly 124) is fastenable to the first frame mount 152 at nine different indices (nine different pinion-frame indices), which may also be referred to as nine different rotational orientations relative to the frame bolt pattern axis 180. When fastened, the pilot 161 of the first pinion subassembly 134 is received by a mating hole on the first frame mount 152. The pilot 161 is cylindrical in shape, and is centered about the frame bolt pattern axis 180 and therefore has a centerline offset from the pinion axis 176. In alternate embodiments, the holes of the frame bolt pattern 178 may be oversized or radially slotted to accommodate the varying alignment between the holes or slots on the first pinion subassembly 134 and the associated holes on the first frame mount 152, and in these circumstances the centerline of the pilot 161 may still be offset from the pinion axis 176 even if the centerline is not shared with the center of the frame bolt pattern axis 180.

The first pinion subassembly 134 also comprises a motor bolt pattern 184 which is positioned on an opposite end of the first pinion subassembly 134 from the frame bolt pattern 178. The motor bolt pattern 184 comprises nine threaded holes radially symmetrically arranged about the pinion axis 176. The first motor 136 has nine matching holes, such that nine bolts may simultaneously pass through each hole on the first motor 136 and be threaded into a matching hole on the motor bolt pattern 184. In this way, the first motor 136 is fastenable to the first pinion subassembly 134 at nine different indices (i.e., nine different motor-pinion indices), which may also be referred to as nine different rotational orientations relative to the pinion axis 169.

The pinion axis 176 is offset from the frame bolt pattern axis 180 and centerline of the pilot 161 by 0.25 millimeters. For purposes of this disclosure, "offset" means that there is a distance between the intersections of these two axes with a plane 186 which is perpendicular to the pinion axis 176 and bisects the first pinion 130. By offsetting the pinion axis 176 from the frame bolt pattern axis 180 and centerline of the pilot 161, a change in the index (rotational orientation) at which the first pinion subassembly 134 is fastened to the frame 106 changes the distance from the pinion axis 176 to the ring axis 118, thereby changing the backlash between the first pinion 130 and the ring gear 128. As an example, the first motor assembly 124 may be unfastened from the frame 106 and rotated two pinion-frame index positions, which consists of eighty degrees of rotation in this embodiment, and refastened to the frame 106 to change the backlash between the first pinion 130 and the ring gear 128. Backlash is adjusted by this method because the pilot 161 is not centered about the pinion axis 176 but is instead centered about the frame bolt pattern axis 180, so that changes to the pinion-frame index result in movement of the pinion axis 176 along the plane 186.

In the embodiment shown in FIGS. 1-4, the frame bolt pattern 178 and the motor bolt pattern 184 are each radially symmetric at the same angular interval (forty degrees). This allows for the adjustment of the first motor assembly 124 such that the angular orientation of the first motor 136 may remain the same regardless of the pinion-frame index selected (i.e., the index for the frame bolt pattern 178). As one example of a method of adjusting backlash, if the first motor assembly 124 is unfastened from the first frame mount 152 and disassembled, then the first pinion subassembly 134 is refastened to the first frame mount 152 one index position clockwise (when viewed from the vehicle side 104) from where it started, the first motor 136 may be refastened to the first pinion subassembly 134 one index position counterclockwise from where it started and the rotational direction in which the first work port 162 and second work port 164 are facing will not be changed. Due to the 0.25 millimeter offset of the pinion axis 176 from the frame bolt pattern axis 180 and centerline of the pilot 161, the change in the index for the first motor assembly 124 will change the distance from the pinion axis 176 to the ring axis 118 and thereby change the backlash between the first pinion 130 and the ring gear 128. Stated differently, by changing the pinion-frame index of the first pinion subassembly 134 to the first frame mount 152 and rotating an amount in a first rotational direction and changing the motor-pinion index of the first motor 136 to the first pinion subassembly 134 and rotating that same amount in a second rotational direction opposite the first rotational direction, backlash may be adjusted without changing the rotational orientation of the first motor 136 to the first frame mount 152 (i.e., each of the pinion-frame indices has an associated motor-pinion index which results in the same rotational orientation of the first motor 136 to the first frame mount 152). This design thus allows for multiple levels of adjustment (as different indexes provide different distances between the pinion axis 176 and the ring axis 118) for the backlash between the first pinion 130 and the ring gear 128 without significantly changing the hydraulic routing to the first motor 136. If the motor 136 were an electric motor instead of a hydraulic motor, it would allow for the adjustment of backlash without significantly changing the electric routing to the motor. While the phrase "same rotational orientation" (or "substantially the same") is used herein, it is understood that minor variations in the rotational orientation may be present due to typical manufacturing tolerances.

In one alternate embodiment, the first motor assembly 124 may lack a first pinion subassembly 134. In such an embodiment, the first pinion 130 may be mounted on the output shaft 166 of the alternate motor and rotate about the pinion axis 176, and the alternate motor may be fastenable to the frame 106 at a plurality of indices via a bolt pattern on the motor arranged around a bolt axis. By offsetting the bolt axis on the alternate motor from the pinion axis 176, the distance of the pinion axis 176 from the ring axis 118 would still vary depending on the rotational index at which the alternate motor assembly was fastened to the frame 106. Such an alternate embodiment may reduce the number of components in the motor assembly and eliminate the cost and packaging of the first pinion subassembly 134, but may require increased cost for a less typical housing design for the alternate motor and the addition of bearings into the motor, and may require changes in hydraulic line routing upon changes to the index of the alternate motor relative to the frame.

While the above description applies to the first motor assembly 124, it can be appreciated that the second motor assembly 126, third motor assembly, and fourth assembly are similarly constructed.

Without in any way limiting the scope, interpretation, or application of the claims appearing below, a technical effect of one or more of the example embodiments disclosed herein is to provide an apparatus for, and method of, changing the backlash of one or more pinions engaged with a ring gear. More specifically, the backlash may be adjusted by unfastening a motor assembly from a mount, rotating it to change its index relative to its mount, and then refastening it to the mount, which changes backlash because the pinion axis is offset from the bolt pattern and pilot by which the motor assembly is fastened to the mount, and thus changes to the index change the distance between the axis of the pinion and the ring gear to which the pinion is engaged. Another technical effect of one or more of the example embodiments disclosed herein is to provide the motor assembly with a pinion subassembly such that backlash may be adjusted via changes to the pinion subassembly index without changing the rotational orientation of the motor and its associated electrical or hydraulic lines. Another technical effect of one or more example embodiments disclosed herein is to have the pinion subassembly provide bearing support of the rotating components connected to the motor, thereby mitigating side loads to the output shaft of the motor.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A wrist for attachment to a boom of a work vehicle, the wrist comprising:
    a frame comprising a frame mount, the frame mount fixedly connected to the frame;
    a slew bearing mounted to the frame and comprising a ring gear rotatable relative to the frame about a ring axis; and
    a motor assembly comprising:
        a motor comprising an output shaft; and
        a pinion subassembly comprising an internal shaft, an internal spline connected to the internal shaft and positioned on a first side of the pinion subassembly, a pinion rotatable about a pinion axis connected to the internal shaft and positioned on a second side of the pinion subassembly opposite the first side, a motor bolt pattern positioned on the first side, and a frame bolt pattern positioned on the second side, the motor fastenable to the pinion subassembly at a plurality of motor-pinion indices via the motor bolt pattern, the pinion subassembly fastenable to the frame mount at a plurality of pinion-frame indices via the frame bolt pattern, the pinion meshed with the ring gear when the pinion subassembly is fastened to the frame mount via the frame bolt pattern, the internal spline receiving the output shaft and the pinion driveable by the output shaft when the motor is fastened to the pinion subassembly via the motor bolt pattern;
    wherein a distance between the ring axis and the pinion axis when the pinion subassembly is fastened to the frame mount varies for the plurality of pinion-frame indices.

2. The wrist of claim 1, wherein the distance is measured along a plane perpendicular to the pinion axis and bisecting the pinion when the motor is fastened to the pinion subassembly and the pinion subassembly is fastened to the frame mount.

3. The wrist of claim 2, wherein the output shaft is rotatable about the pinion axis.

4. The wrist of claim 3, wherein the motor bolt pattern comprises a plurality of holes radially symmetrically arranged about the pinion axis.

5. The wrist of claim 4, wherein the pinion subassembly further comprises a cylindrical pilot configured to be received by a mating hole on the frame mount and the pilot is centered about an axis offset from the pinion axis.

6. The wrist of claim 5, wherein the offset is measured along the plane.

7. The wrist of claim 6, wherein the offset is at least 0.2 millimeters.

8. The wrist of claim 7, further comprising:
    a first motor-pinion index and a second motor-pinion index each included in the plurality of motor-pinion indices;
    a first pinion-frame index and a second pinion-frame index each included in the plurality of pinion-frame indices;
    a first distance between the ring axis and the pinion axis when the pinion subassembly is fastened to the frame mount at the first pinion-frame index; and
    a second distance between the ring axis and the pinion axis when the pinion subassembly is fastened to the frame mount at the second pinion-frame index;
    wherein a difference between the first distance and the second distance is at least 0.4 millimeters.

9. The wrist of claim 8, wherein the first distance is measured along the plane when the pinion subassembly is fastened to the frame mount at the first pinion-frame index and the second distance is measured along the plane when the pinion subassembly is fastened to the frame mount at the second pinion-frame index.

10. The wrist of claim 9, further comprising:
    a first rotational orientation of the motor relative to the frame about the pinion axis when the motor is fastened to the pinion subassembly at the first motor-pinion index and the pinion subassembly is fastened to the frame mount at the first pinion-frame index; and
    a second rotational orientation of the motor relative to the frame about the pinion axis when the motor is fastened to the pinion subassembly at the second motor-pinion index and the pinion subassembly is fastened to the frame mount at the second pinion-frame index;

wherein the first rotational orientation is the same as the second rotational orientation.

11. The wrist of claim 9, wherein the motor bolt pattern is radially symmetric at the same angular interval as the frame bolt pattern.

12. The wrist of claim 11, wherein the pinion subassembly further comprises a first bearing and a second bearing, the first bearing supporting the internal shaft on the first side and the second bearing supporting the internal shaft on the second side.

13. A method of adjusting gear backlash of a wrist for attachment to a boom of a work vehicle, the wrist comprising a frame, a ring gear rotatable about a ring axis, and a motor assembly comprised of a pinion subassembly and a motor, the method comprising the steps of:

unfastening the pinion subassembly fastened to the frame at a first pinion-frame index, the pinion subassembly comprising a pinion rotatable about a pinion axis, the pinion meshed with the ring gear when the pinion subassembly is fastened to the frame at the first pinion-frame index or a second pinion-frame index, the pinion axis a first distance from the ring axis when the pinion subassembly is fastened to the frame at the first pinion-frame index;

unfastening the motor fastened to the pinion subassembly at a first motor-pinion index, the motor comprising an output shaft received by an internal spline of the pinion subassembly when the motor is fastened to the pinion subassembly at the first motor-pinion index or a second motor-pinion index;

refastening, after unfastening the motor, the motor to the pinion subassembly at the second motor-pinion index; and refastening, after unfastening the pinion subassembly, the pinion subassembly to the frame at the second pinion-frame index, the pinion axis a second distance from the ring axis when the pinion subassembly is fastened to the frame at the second pinion-frame index, the difference between the first distance and the second distance being at least 0.2 millimeters.

14. The method of claim 13, wherein the rotational orientation of the motor relative to the frame about the pinion axis before unfastening the pinion subassembly and motor is substantially the same as it is after refastening the motor and pinion subassembly.

15. The method of claim 14, wherein the distance is measured along a plane perpendicular to the pinion axis and bisecting the pinion when the motor is fastened to the pinion subassembly and the pinion subassembly is fastened to the frame.

16. The method of claim 15, wherein the output shaft is rotatable about the pinion axis.

17. The method of claim 16, wherein the pinion subassembly is fastenable to the frame via a frame bolt pattern at a plurality of pinion-frame indices, including the first pinion-frame index and the second pinion-frame index, and the motor is fastenable to the pinion subassembly via a motor bolt pattern at a plurality of motor-pinion indices, including the first motor-pinion index and the second motor-pinion index.

18. The method of claim 17, wherein the frame bolt pattern is radially symmetric at the same angular interval as the motor bolt pattern.

19. The method of claim 18, wherein the pinion subassembly comprises an internal shaft, an internal spline is mounted at a first side of the internal shaft, the pinion is mounted at a second side of the internal shaft opposite the first side, a first bearing supports the internal shaft on the first side, and a second bearing supports the internal shaft on the second side.

20. The method of claim 19, wherein the pinion subassembly further comprises a cylindrical pilot configured to be received by a mating hole on the frame mount and the pilot is centered about an axis offset from the pinion axis.

* * * * *